No. 760,254. PATENTED MAY 17, 1904.
L. ROTTLER.
AUTOMATIC WEATHER STRIP.
APPLICATION FILED FEB. 9, 1903.
NO MODEL. 2 SHEETS—SHEET 1.
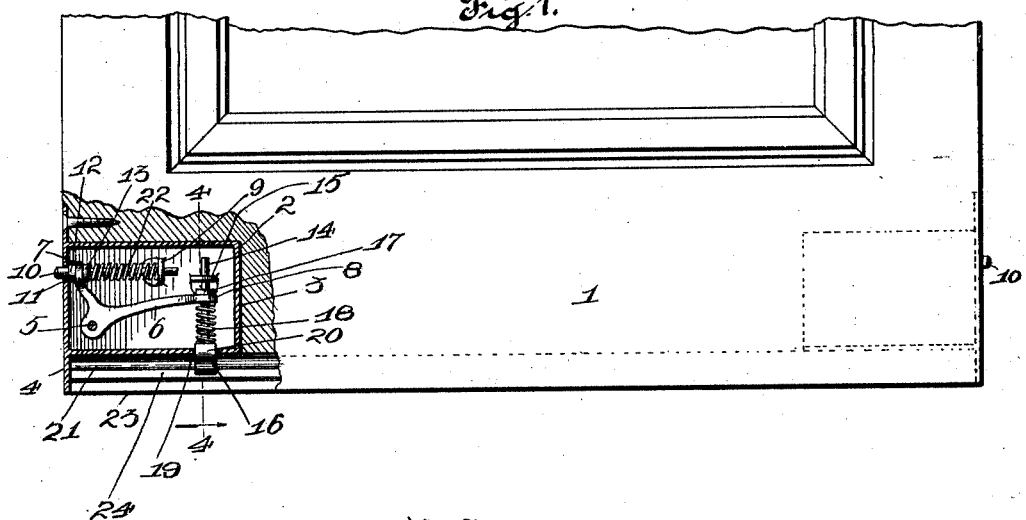
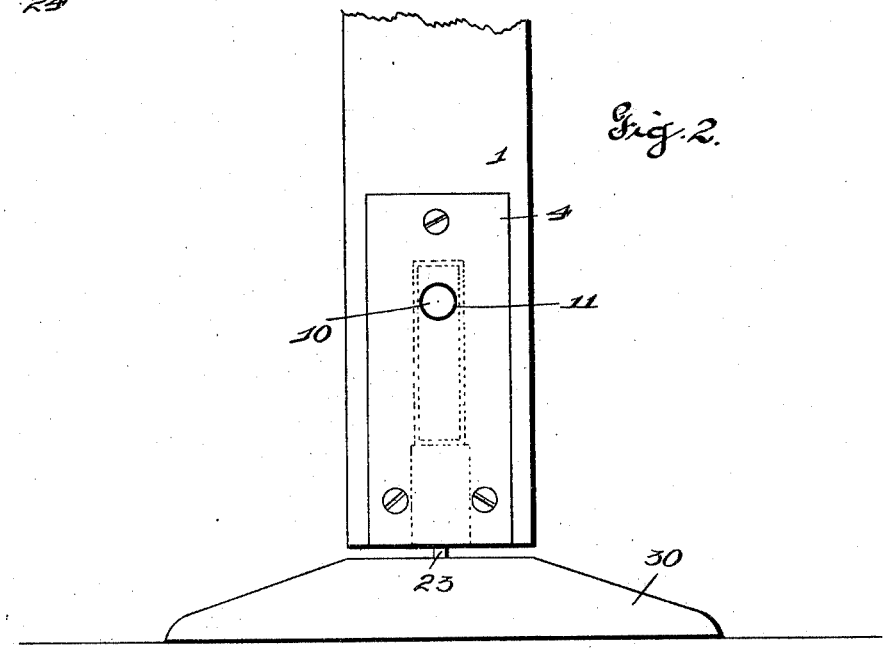
Witnesses
Inventor
Leo. Rottler
by Higdon, Longan & Hopkins
Attys.

No. 760,254. PATENTED MAY 17, 1904.
L. ROTTLER.
AUTOMATIC WEATHER STRIP.
APPLICATION FILED FEB. 9, 1903.
NO MODEL. 2 SHEETS—SHEET 2.
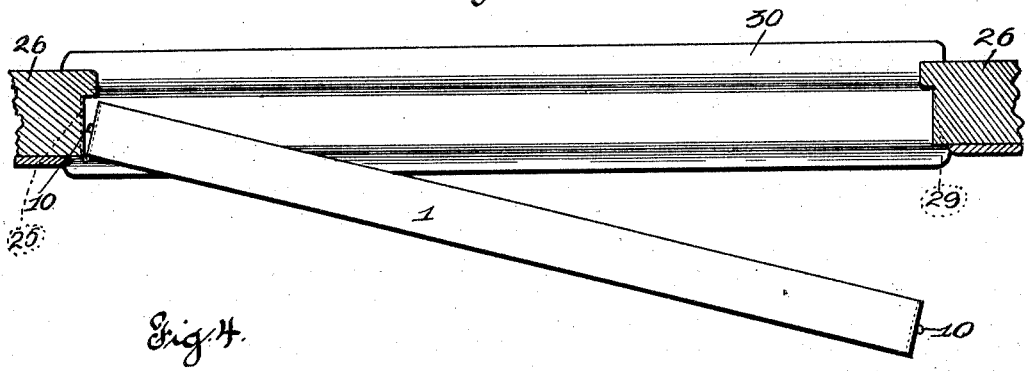
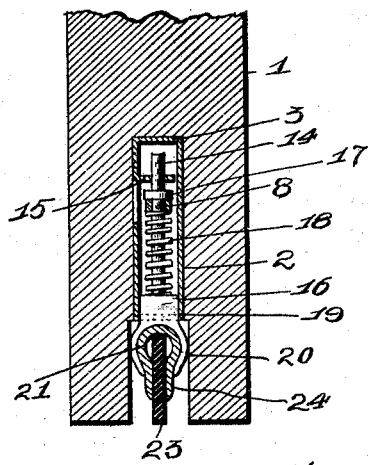
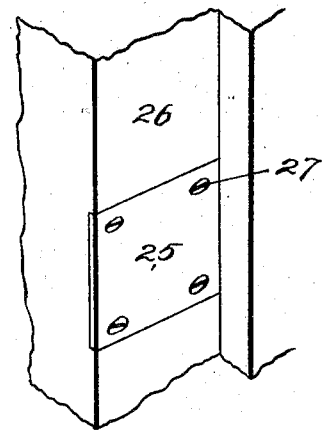
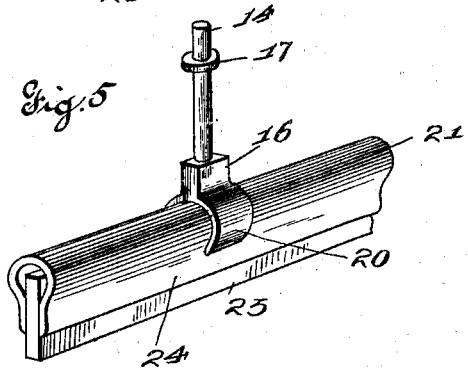
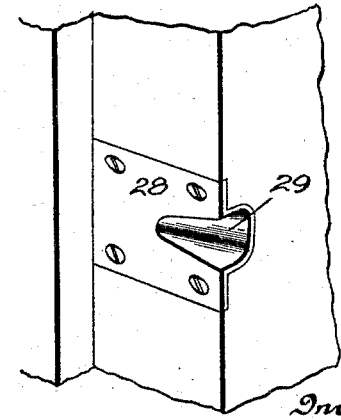
Witnesses
Alfred W Eicks
M Gilrion
Inventor
Leo Rottler
by Higdon & Longan & Hopkins attys.

No. 760,254. Patented May 17, 1904.

UNITED STATES PATENT OFFICE.

LEO ROTTLER, OF ST. LOUIS, MISSOURI.

AUTOMATIC WEATHER-STRIP.

SPECIFICATION forming part of Letters Patent No. 760,254, dated May 17, 1904.

Application filed February 9, 1903. Serial No. 142,678. (No model.)

*To all whom it may concern:*

Be it known that I, LEO ROTTLER, a citizen of the United States, residing at St. Louis, State of Missouri, have invented certain new and useful Improvements in Automatic Weather-Strips, of which the following is a specification containing a full, clear, and exact description, reference being had to the accompanying drawings, forming a part hereof.

My invention relates to automatic weather-strips; and it consists of the novel construction, combination, and arrangement of parts hereinafter shown, described, and claimed.

The object of my invention is to provide an improved automatic weather-strip which shall be economical in cost and reliable in operation.

Figure 1 is a sectional front elevation of a portion of a door having my invention applied thereto. Fig. 2 is a view of a portion of one edge of a door and a carpet-strip enlarged. Fig. 3 is a sectional plan view of the door and its frame. Fig. 4 is a section on the line 4 4 of Fig. 1, but with the parts enlarged. Fig. 5 is a detail perspective view of a portion of the strip-holder. Fig. 6 is a detail view in perspective of a portion of the door-frame having a metallic plate applied thereto. Fig. 7 is a view of the opposite side of the door-frame having a cam-plate applied thereto.

1 indicates the door, which is provided in each edge at the bottom with a mortise 2, in which is located a metallic casing 3, containing the main operative parts of the device. Said casing 3 is provided with perforated flanges 4, by means of which it is secured in position in a manner similar to that of common mortise-locks. Within the casing 3 is pivotally mounted upon the pin 5 a bell-crank lever 6, having perforated arms 7 and 8.

9 indicates a perforated bracket projecting from the interior of the said casing 3 with its perforation in horizontal alinement with the perforation in the arm 7 of said bell-crank lever, and mounted in said alined perforations is a spring-pressed bolt 10. The outer end of the bolt 10 projects through an aperture 11 in the outer edge of said casing. Collars or projections 12 and 13 are formed upon said bolt, one upon either side of said perforated arm 7, so that whenever said bolt is moved longitudinally a corresponding movement will be given said bell-crank lever.

14 indicates another spring-pressed bolt mounted vertically within said casing, with its upper portion supported by a perforated bracket 15 and its lower portion provided with a rectangular shank 16. Fixed upon said vertical bolt 14 immediately beneath said perforated bracket 15 is a shoulder or projection 17. Said vertical bolt is mounted in the perforation of the arm 8, and a coil-spring 18 is mounted upon said bolt between said arm 8 and the said shank 16. Said shank is mounted in the rectangular opening 19, formed in the lower edge of said casing. The lower end of said shank is provided with integral clamping-arms 20, which support the metallic U-shaped strip-holder 21.

A coil-spring 22 is mounted upon the bolt 10 between the perforated bracket 9 and the collar or projection 13.

23 indicates a strip of material, preferably rubber, which is forcibly clamped between the jaws 24 of the strip-holder 21 and held in position thereby.

25 indicates a metal plate which is set into the edge of the door-frame 26 and lies flush therewith and is held in place by means of screws 27.

28 indicates a cam-plate which is set into the door-frame on the opposite side from the plate 25 and is provided at one end with an integral inclined surface 29. Said plates are preferably set near the bottom of the door-frame, so as to be contacted by the projecting bolts 10 when the door is closed.

30 indicates the usual carpet strip beneath the door.

The operation is as follows: The spring 22 of the bolts 10 normally urges said bolts outwardly, so that they project, as shown in Fig. 1. The spring 18 of the bolts 14 normally urges the perforated arms 8 upwardly, so that said spring 18 will act as a cushion for the said arm when the same is moved downwardly. When the door is opened, as shown in Fig. 3, the bolts 10 do not contact with the plates 25 and 28; but when the said door is closed the bolt 10 at the hinged edge of said door comes in contact with the plate 25 and is urged inwardly against the power of the spring 22, and as the inward movement of the door continues the bolt 10 at the free edge of the door will come in contact with the inclined surface 29 and be thereby forced inwardly. The described inward movement of said bolts 10 will cause the arm 8 of the bell-crank lever to be forced downwardly, thereby urging the spring 18 into contact with the shank 16 and forcing downwardly the strip-holder and the strip carried thereby. This downward movement will continue until the strip 23 is forced into intimate contact with the carpet strip 30, and then the downward movement of the strip will of course cease; but the spring will act as a cushion to permit a slight further downward movement of the said arm 8, and thereby exert a continuous yielding pressure upon the said strip until the same is released by opening the door. In this manner the said strip 23 will be operated equally at each edge of the door by means of the separate mechanism located thereat, and such movement will be certain for the reason that power is applied at both ends of the weather-strip.

Upon reopening the door the bolts 10 will be released, and their springs 22 will cause them to assume their normal positions and carry with them the bolts 14 and the strip-holder at the lower end thereof, and the strip 23 will thereby be elevated out of contact with the carpet strip 30, so that said strip 23 may freely move in a plane above said carpet strip without touching the same.

I claim—

1. The improved automatic weather-strip, comprising a strip of rubber or other analogous material adapted to be mounted at the lower edge of a door, the U-shaped strip-holder 21 having opposite integral clamping-jaws, and spring-pressed bolts mounted in opposite edges of said door and connected to said strip-holder so that the same will be elevated equally at both ends when the door is opened, and forced downwardly when the said door is closed, substantially as specified.

2. The improved automatic weather-strip, comprising a strip of rubber or other analogous material adapted to be mounted at the lower edge of the door, the U-shaped strip-holder 21 having opposite integral clamping-jaws; spring-pressed bolts and bell-crank levers mounted in opposite edges of said door and connected to said strip-holder so that the same will be elevated equally at both ends when the door is opened, and forced downwardly when the said door is closed; and mortise-casings in which said bolts and bell-crank levers are mounted, substantially as specified.

In testimony whereof I have signed my name to this specification in presence of two subscribing witnesses.

LEO ROTTLER.

Witnesses:
   ALFRED A. EICKS,
   M. D. IRION.